Figure 1:
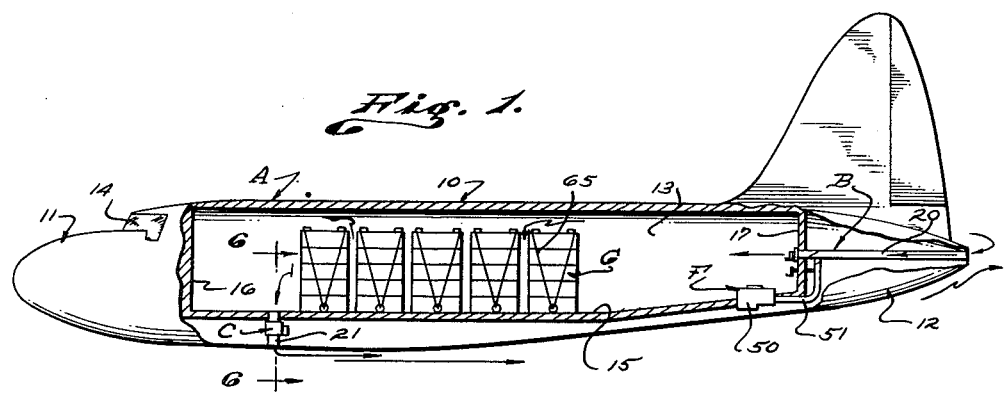

Nov. 16, 1954 — J. B. REICHERT — 2,694,537
AIR-CONDITIONED AIRCRAFT
Filed April 3, 1950 — 2 Sheets-Sheet 1

INVENTOR.
James B. Reichert
BY
Attorney

Nov. 16, 1954  J. B. REICHERT  2,694,537
AIR-CONDITIONED AIRCRAFT
Filed April 3, 1950  2 Sheets-Sheet 2

INVENTOR.
James B. Reichert
BY
Attorney

United States Patent Office 2,694,537
Patented Nov. 16, 1954

2,694,537

AIR-CONDITIONED AIRCRAFT

James B. Reichert, Berkeley, Calif.

Application April 3, 1950, Serial No. 153,661

14 Claims. (Cl. 244—118)

This invention has to do with air conditioned aircraft and it is a general object of the invention to provide a simple, practical, effective construction applicable to or for incorporation in an aircraft for maintaining a desired condition of air therein, the invention being particularly practical for craft that is heavier than air.

It is desirable in many situations to air condition aircraft as by cooling the air therein, by heating the air therein, or by circulating air therein so that it is fresh and clean. Such air conditioning is particularly important in the case of arcraft being used as cargo carriers and where perishable or refrigerated materials are being handled.

Usual methods or apparatus used for air conditioning are not altogether satisfactory, particularly if applied to heavier than air craft, in that they are usually more or less complicated or are chaarcterized by features that are unreliable or undesirable. Heretofore, air scoops have been employed for gaining circulation of air in aircraft, but have certain well recognized disadvantages, and air conditioning equipment involving refrigerant containers, compressors and other such paraphernalia are obviously not well suited for use in aircraft.

It is a general object of this invention to provide a construction by which a satisfactory circulation of air may be maintained in an aircraft while it is in use or flight, without the use of or resort to air scoops, ram type devices, fans, blowers, or other such elements or paraphernalia.

Another object of this invention is to provide for a desirable circulation of air through a chamber in an aircraft employing air from the exterior of the craft and operating to maintain a desired condition under varying circumstances.

A further object of the invention is to provide an air conditioning construction that is effective and dependable and is not subject to being impaired or disabled by reason of snow or ice such as generally impairs the action of ram type apparatus.

It is a further object of the invention to provide structure for effecting satisfactory air conditioning of an aircraft without materially adding to the weight of the aircraft and without employing cumbersome or bulky equipment that interferes with the cargo carrying space of the craft.

A further object of the invention is to provide air conditioning equipment for aircraft of the general character referred to including air tempering means and controls by which cool or cold air from the exterior of the craft can be introduced into the craft to have a cooling effect, or by which air from the exterior of the craft is heated so that a desired temperature is maintained within the craft.

It is another object of this invention to provide air conditioning structure in an aircraft utilizing pressure differential at different parts of the exterior of the craft as a means for gaining circulation of air within the craft.

The structure embodying the preseent invention is applied to or utilizes the fuselage of an aircraft and the cargo carrying compartment or chamber of the fuselage may be the point in the craft where the air conditioning is to be utilized or made effective. The invention provides an air outlet duct extending from the chamber in the fuselage to a point at the exterior of the fuselage where a high air velocity occurs while an air inlet duct extends from a point at the exterior of the fuselage where a lower air velocity occurs to the said chamber. In a preferred arrangement and in the case of a typical fuselage the air outlet opens at the exterior of the fuselage at the body or belly portion thereof where the fuselage is large in cross section, while the air inlet is open at the tail of the fuselage where the fuselage is of minimum size. Pressure of air against the exterior of the fuselage varies with air velocity and as a result a pressure differential occurs between the inlet and the outlet so that air flows into the chamber through the inlet and passes out of the chamber through the outlet. Flow controls are provided in connection with the inlet and outlet and may be subject to manual control or thermal control. For purpose of example one, such as the inlet, may be manually controlled, and the other, or outlet, may be thermally controlled. The invention provides means for heating or tempering air introduced into the chamber and for this purpose a heater is provided and a heater duct extends from the air inlet to the heater so that air, instead of being allowed to flow directly into the chamber may be passed through the heater to discharge therefrom into the chamber. The invention further provides cargo carriers, preferably in the form of ventilated boxes or the like, and a cover is preferably provided to encase or to be engaged over a group of cargo carriers, in which event air pipes may be provided to feed either cold or heated air to the space under the cover and to conduct air from beneath the cover to the outlet. Through this structure a portion of the chamber is, in effect, isolated so that it can be maintained under an air condition different from the remainder of the chamber as conditions may require.

Figure 2:
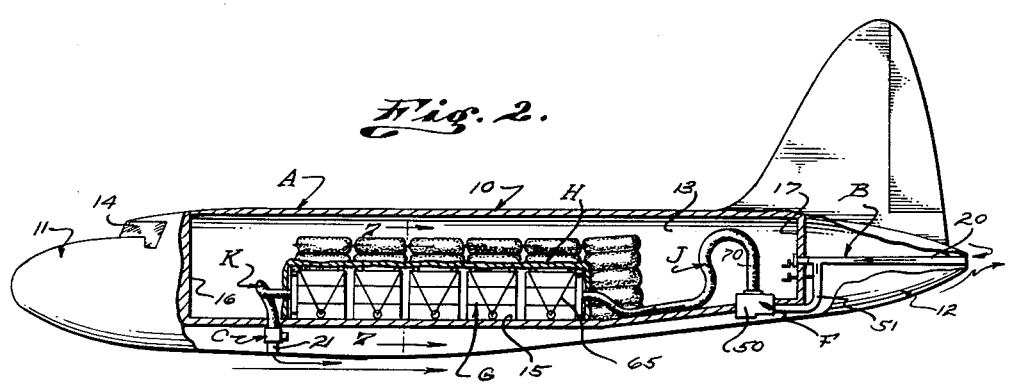
Figure 3:
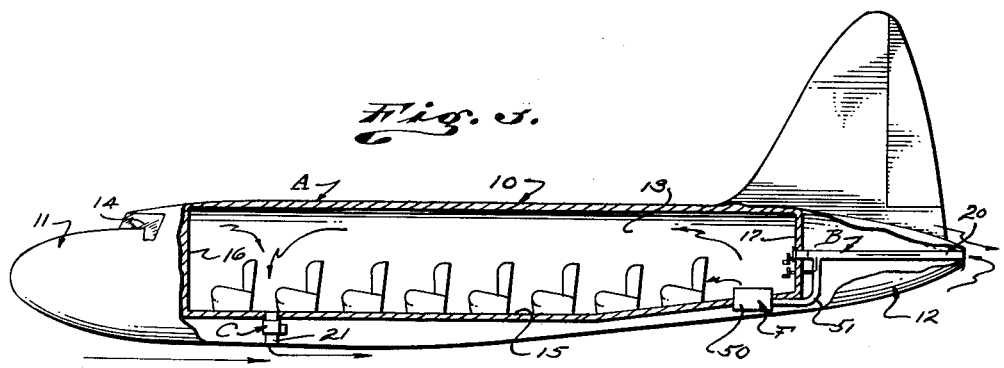
Figure 4:
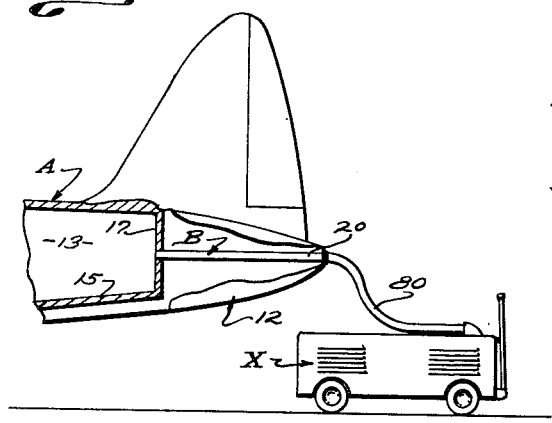
Figure 5:
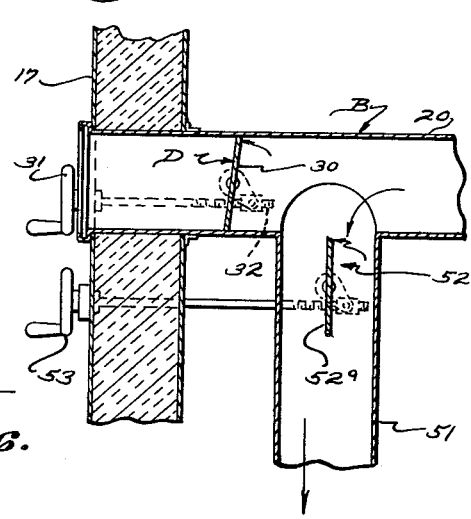
Figure 6:
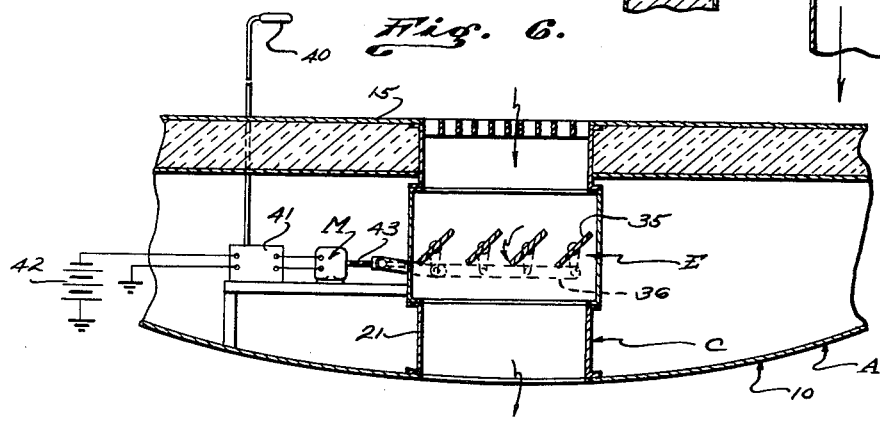
Figure 7:
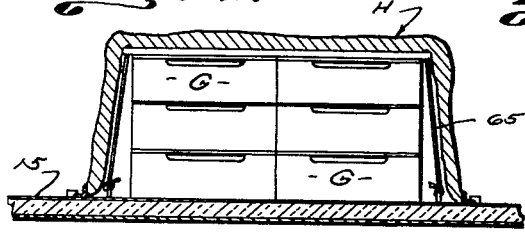
Figure 9:
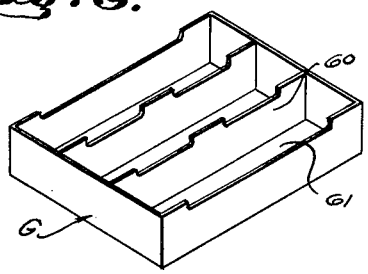
Figure 8:
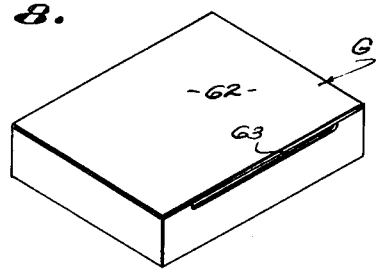

The various objects and features of my invention will be fully understood from the following detailed description of typical preferred forms and applications of my invention, throughout which description reference is made to the accompanying drawings, in which:

Fig. 1 is a side view of a typical fuselage embodying the present invention and showing portions in section to indicate the features of construction provided by the present invention, and in this figure of the drawing I illustrate a simple form of invention in which the general principles are utilized. Fig. 2 of the drawings is a view similar to Fig. 1 showing a variation in construction where cargo carriers are employed and are engaged beneath the cover and where pipes are provided circulating air beneath the cover to the exclusion of other parts of the fuselage chamber. Fig. 3 is a view similar to Figs. 1 and 2 showing the chamber of the fuselage equipped with passenger carrying seats rather than being employed as a cargo carrier. Fig. 4 is a view of the rear or tail portion of the fuselage showing it coupled with air conditioning equipment such as may be employed when the craft is on the ground either before or after flight. Fig. 5 is an enlarged detailed sectional view of a portion of the construction that may be employed in the rear end portion of the fuselage. Fig. 6 is an enlarged detailed sectional view of a portion of the structure employed at the air outlet, being a view taken as indicated by line 6—6 on Fig. 1. Fig. 7 is an enlarged detailed sectional view taken as indicated by line 7—7 on Fig. 2. Fig. 8 is a perspective view of a cargo carrier shown employed in Figs. 1, 2 and 7 of the drawings, and Fig. 9 is a perspective view of a cargo carrier with the cover removed.

The present invention is particularly practical as applied to heavier than air craft and will be described as applied to or incorporated in that type of craft commonly employed to handle cargo or a plurality of passengers. In Figs. 1 and 2 of the drawings arrangements are shown for handling cargo, whereas in Fig. 3 an arrangement is shown for handling passengers.

The particular aircraft illustrated in the drawings is characterized by a fuselage A which is essentially an elongate tubular shell-like structure having a central or body portion 10 of substantial size or diameter, a top portion 11 closing the forward end of the body, and a tail portion 12 closing the rear end of the body. The body or belly portion 10 of the fuselage is the portion of the fuselage generally employed to establish or to provide a suitable chamber 13 for carrying cargo or passengers and it may be substantially uniform in size and shape throughout its length, although variations in form and size may occur as dictated by design or aerodynamics. The nose end portion 11 of the fuselage may provide a suitable pilot compartment at 14 and is shown as rounded in the manner common to structures of this general character. The tail end portion 12 of the fuselage contracts as it continues rearwardly from the body and is definitely smaller and of more limited cross sectional extent than any other portion of the fuselage.

The chamber or compartment 13 provided in the fuselage may be considered as confined to the body portion 10 of the fuselage and in the particular case illustrated it is defined by parts such as a floor 15, a forward or front end bulkhead 16, and a rear end bulkhead 17. It is to be understood of course that other structural elements such as walls, partitions or bulkheads may be provided as circumstances may require.

The present invention provides the bulkhead 17 either with inlet means B, air outlet means C, air controls D and E at the means B and C, respectively, and air tempering means F. The invention further contemplates cargo carriers G located in the chamber 13, a cover H engageable over the cargo carriers G, and air pipes J and K by which air is circulated beneath the cover.

The air inlet means B extends from a point at the exterior of the fuselage to the chamber 13. The means B may be formed by a suitable air duct 20 and the duct 20 is preferably arranged and related so that its receiving end is at the tail portion of the fuselage to receive air from the exterior of the fuselage and it discharges into the rear end portion of the chamber, as for instance through the rear bulkhead 17. In the particular arrangement illustrated in the drawings the air duct 20 is a simple straight tubular duct of suitable capacity opening rearwardly at the rearmost end of the tail portion and discharging into the chamber 13 through the bulkhead 17.

The air outlet means C is preferably a simple air duct 21 receiving air from the interior of the fuselage, for instance from the chamber 13, and conducting it to discharge at the exterior of the fuselage, preferably at the body portion thereof. In the preferred arrangement the duct 21 connects into the forward end portion of chamber 13 through the floor 15 and it opens downwardly or laterally of the fuselage at a point where the fuselage is of substantial, if not maximum, diameter at which point or portion the air velocity past the fuselage is at or near maximum. The air inlet duct being located at the tip of the tail portion, air pressure is substantially higher there than where the duct 21 opens laterally at the exterior of the fuselage, and consequently an air pressure differential occurs between the points where the ducts 20 and 21 open at the exterior of the fuselage. This pressure differential results in flow or circulation of air so that air flows into the chamber 13 through duct 20 and out of the chamber 13 through duct 21.

In accordance with the broader principles of the invention the air controls or flow control means D and E may vary widely in form, construction and action. For example, either one or both of these means may be manually operated or may be responsive to certain conditions such as temperature. In the drawings and for purpose of illustration the flow control D in connection with the inlet means B is manually operated, whereas the flow control E in connection with the outlet C is thermally controlled.

The flow control means D is shown located in the discharge end portion of the duct 20 and it may involve a simple, damper-like element 30 under control of a manually operated member or hand wheel 31. The wheel is shown operatively coupled with the damper or control valve 30 through a screw 32. The hand wheel 31 is located immediately inside the rear bulkhead 17. However, it is to be understood that it can be located in any suitable or convenient part of the structure. The flow control means E is shown as a damper or valve structure involving a plurality of pivoted valve members 35 coupled by means of a link 36 so that they operate in synchronism. The valve members are located in the duct 21. The thermostatic control provided for operating the valve members 35 is shown as involving a thermally responsive element 40 controlling operation of a power unit or motor M through a suitable control unit 41. The elements just described are shown energized from a source 42 of electrical energy and the motor is shown coupled to the link 36 through an operating screw 43. It is to be understood that the control 41 which is governed by the thermostatic unit 40 may involve suitable relays and other elements common to structures of this type. In practice it is preferred that the thermostatic unit 40 be located in the chamber 13 and it is preferred, in practice, to employ a unit 40 that is adjustable or which can be varied so that its action can be set to meet varying conditions.

The air heating means F involves one or more heaters 50 arranged to discharge into chamber 13, preferably at the rear end portion thereof. In the drawings I have shown a single heater 50 and an air duct 51 extending from inlet duct 20 ahead of the control means D for passage through the heater. A flow control 52 is provided in connection with the duct 51 which may involve a valve 52ª under control of a hand wheel 53. It will be observed from Fig. 5 of the drawings that the structure just described may be similar to that employed as the means D. In Fig. 5 of the drawings the means D is shown fully closed in which case all of the incoming air is passed through duct 51 to flow through the heater 50. It will be understood that by suitable variations or adjustment of the controls D and 52 any desired proportioning of air may be gained. For instance a desired portion may be discharged directly into chamber 13 while the balance is passed through the heater. In the arrangement illustrated in Fig. 1 the heater is such as to discharge directly into compartment 13, and being located in the rear end portion of the chamber 13 the heated air circulates forwardly through the chamber to finally discharge at the forward end portion thereof.

The carriers G are box-like elements suitable for carrying cargo such as food or perishable material and for purpose of example they are shown as simple ventilated box-like structures. Each carrier is shown provided with partitions 60 dividing it into several compartments 61 and the structure is such that when its top 62 is in place vent openings 63 occurs at opposite sides so that there may be circulation of air to the several compartments. A suitable number and arrangement of cargo carriers is established in the compartment 13 and may be secured or lashed in place by holding devices 65. In practice the cargo carriers can be employed in a manner such as is shown in Fig. 1 and the entire chamber 13 can be air conditioned through the structure above described. In Figs. 2 and 7 of the drawings I show a cover H engaged over the group of cargo carriers and the cover may be a flexible blanket-like structure or element of insulating material such as to effectively confine or insulate the cargo carriers. Ordinarily when a cover H is employed over a group of cargo carriers it is preferred to circulate air in the space defined by or covered by the cover H and in which the cargo carriers are arranged. For this purpose an air inlet pipe J is provided in communication with the cover at one point and an air outlet pipe K is provided in connection with the cover at a spaced point. The inlet pipe J may be a suitable flexible hose-like element and may be such that one end can be engaged either with th heater 50 or with the discharge end of duct 20. In Fig. 2 of the drawings the pipe J is shown coupled to the heater 50 through a suitable releasable coupling device 70. Through the same coupling device the pipe J may be connected to the duct 20.

The pipe K preferably extends to the intake or receiving end of the outlet duct 21. Through the construction just described cool or cold air entered through the inlet duct 20 or warm air from heater 50 may be circulated through the cargo carriers beneath the cover H, as circumstances require.

In practice the structure hereinabove described is effective when the aircraft is in flight but the desired flow or circulation of air does not occur when the aircraft is grounded. Because of this it may be desirable, in practice, to provide a suitable refrigerant in the chamber 13 sufficient to maintain the desired temperature prior to flight or following flight and before the cargo is unloaded, or, as shown in Fig. 4, an air conditioning unit X may be provided at the landing place and may be such as to supply air under proper conditions to the inlet duct through a suitable supply pipe 80.

The unit X may be such as to not only circulate air, that is, it may involve a fan or blower that causes flow of air, but it may also either cool or heat air as circumstances may require.

When the apparatus of the present invention is in operation, that is, when the aircraft is in flight, the desired pressure differential occurs between the inlet and outlet ducts so that there is flow in at the tail portion of the aircraft and discharge of air out through the body or belly portion. It will be apparent from the foregoing description that the air thus circulated may be employed in the fuselage under the conditions that it is received or it may be tempered or modified as by the heater 50. Further, it will be understood that since air varies in temperature at different elevations the operator of the aircraft may, in practice, fly the craft at such altitude as to receive air at a suitable temperature. Since air at high altitudes is cool or cold no refrigerating equipment is necessary. However, under some conditions the desired altitude of flight may be such as to supply air which is colder than is desired, in which case the heating means F may be operated. From the foregoing description it will be apparent that by suitable setting or coordination of the controls D, E and 52, desired operating conditions may be maintained in the compartment 13.

It is important to observe that in carrying out the present invention the equipment added to the aircraft is simple and such that it can be light and inexpensive, and the working parts are all such that they are simple and dependable. It is also important to observe that the apparatus provided by the present invention is such that the various controls are easily operated or may be readily set for desired conditions and under ordinary circumstances need little or no attention or manipulation.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. An aircraft of the character described including, an elongate fuselage with a body portion of substantial size, a forwardly converging nose portion projecting forward from the body portion, and a tail portion projecting rearwardly from the body portion and being substantially smaller than the body, an air inlet including a duct open and terminating at the exterior of the fuselage tail portion and discharging inlet air into the fuselage, and an air outlet including a duct extending from the interior of the fuselage to and terminating at the exterior of the body portion thereof and opening laterally of the fuselage.

2. In combination with an elongate fuselage of an aircraft which fuselage has walls defining a chamber, has a body portion of substantial size, a forwardly converging nose portion projecting forward from the body portion, and a tail portion substantially smaller than the body portion and projecting rearwardly therefrom, an air inlet duct extending from the exterior of the fuselage tail portion to the chamber and opening into the chamber, and an air outlet duct extending from the chamber to the exterior of the fuselage body portion and opening laterally of the fuselage.

3. An aircraft of the character described including, an elongate fuselage defining a chamber and having a body portion where it is of maximum size, a forwardly converging nose portion projecting forward from the body portion, and a tail portion where it is of minimum size, an air inlet duct extending from the exterior of the fuselage tail portion to the chamber, an air outlet duct extending from the chamber to the exterior of the fuselage body and opening laterally of the fuselage, and means in one of the ducts adapted to control the flow of air therethrough.

4. An aircraft of the character described including, an elongate fuselage defining a chamber and having a body portion where it is of maximum size, a forwardly converging nose portion projects forward from the body portion, and a tail portion smaller than the body portion and projecting rearwardly therefrom, an air inlet duct extending from the exterior of the fuselage tail portion to the chamber, an air outlet duct extending from the chamber to the exterior of the fuselage body where it opens laterally of the fuselage body, a flow control in each of the ducts and a thermally responsive element governing the control.

5. An aircraft of the character described including, an elongate fuselage defining a chamber and having a body portion where it is of maximum size, a forwardly converging nose portion projects forward from the body portion, and a tail portion smaller than the body portion and projecting rearwardly therefrom, an air inlet duct extending from the exterior of the fuselage tail portion to the chamber, an air outlet duct extending from the chamber to the exterior of the fuselage body where it opens laterally of the fuselage, a flow control in one of the ducts and a thermally responsive element governing the control.

6. An aircraft of the character described including, an elongate fuselage defining a chamber and having a body portion where it is of maximum size, a forwardly converging nose portion projects forward from the body portion, and a tail portion smaller than the body portion and projecting rearwardly therefrom, an air inlet duct extending longitudinally of the fuselage from the exterior of the fuselage tail portion to the chamber, an air outlet duct extending transversely of the fuselage from the chamber to the exterior of the fuselage body where it opens laterally of the fuselage, a manually operated flow control in one of the ducts and a thermally responsive element governing the control.

7. An aircraft of the character described including, an elongate fuselage defining a chamber and having a body portion where it is of maximum size, a forwardly converging nose portion projects forward from the body portion, and a tail portion smaller than the body portion and projecting rearwardly therefrom, an air inlet duct extending from the exterior of the fuselage tail portion to the chamber, an air outlet duct extending from the chamber to the exterior of the fuselage body where it opens laterally of the fuselage, a flow control in each of the ducts, a thermally responsive element governing one of the controls, and a manually operated means governing the other control.

8. An aircraft of the character described including, an elongate fuselage defining a chamber and having a body portion where it is of maximum size, a forwardly converging nose portion projects forward from the body portion, and a tail portion smaller than the body portion and projecting rearwardly therefrom, an air inlet duct extending from the exterior of the tail portion to the chamber, an air outlet duct extending from the chamber to the exterior of the body and opening laterally of the fuselage, and a heater related to the inlet duct and adapted to temper air handled by the inlet duct.

9. An aircraft of the character described including, an elongate fuselage defining a chamber and having a body portion where it is of maximum size, a forwardly converging nose portion projects forward from the body portion, and a tail portion smaller than the body portion and projecting rearwardly therefrom, an air inlet duct extending from the exterior of the fuselage tail portion to and opening into the rear end portion of the chamber, an air outlet duct extending from the forward end portion of the chamber to the exterior of the fuselage body and opening laterally of the fuselage, and means controlling the flow of air.

10. An aircraft of the character described including, an elongate fuselage defining a chamber and having a body portion where it is of maximum size, a forwardly converging nose portion projects forward from the body portion, and a tail portion smaller than the body portion and projecting rearwardly therefrom, an air inlet duct extending from the exterior of the tail portion to the chamber, an air outlet duct extending from the chamber to the exterior of the body where it opens laterally of the fuselage, covered cargo carriers in the chamber, and means passing air from the inlet duct to said cargo carriers for passage therefrom and out the fuselage through the outlet duct.

11. An aircraft of the character described including, an elongate fuselage defining a chamber and having a body portion where it is of maximum size and a tail portion where it is of minimum size, an air inlet duct extending from the exterior of the tail portion to the chamber, an air outlet duct extending from the chamber to the exterior of the body and opening laterally of the fuselage, covered cargo carriers in the chamber, means passing air from the inlet duct to said cargo carriers, and means selectively operating to heat air passed by the inlet duct to the chamber and the means passing air to the cargo carriers.

12. An aircraft of the character described including, an elongate fuselage defining a chamber and having a body portion where it is of maximum size, a forwardly converging nose portion projects forward from the body portion, and a tail portion smaller than the body portion and projecting rearwardly therefrom, an air inlet duct extending from the exterior of the tail portion to the chamber, an air outlet duct extending from the chamber to the exterior of the body and opening laterally of the fuselage, covered cargo carriers in the chamber, means passing air from the inlet duct to said cargo carriers, and a pipe conducting air from the cargo carriers to the outlet duct.

13. An aircraft of the character described including, an elongate fuselage defining a chamber and having a body portion where it is of maximum size, a forwardly converging nose portion projects forward from the body portion, and a tail portion smaller than the body portion and projecting rearwardly therefrom, an air inlet duct extending from the exterior of the tail portion to the chamber, an air outlet duct extending from the chamber to the exterior of the body and opening laterally of the fuselage, cargo carriers in the chamber, an insulating cover over the carriers, and means conducting air from the inlet duct to the carriers and from the carriers to the outlet duct.

14. An aircraft of the character described including, an elongate fuselage defining a chamber and having a body portion where it is of maximum size, a forwardly converging nose portion projects forward from the body portion, and a tail portion smaller than the body portion and projecting rearwardly therefrom, an air inlet duct extending from the exterior of the tail portion to the chamber, an air outlet duct extending from the chamber to the exterior of the body and opening laterally of the fuselage, a heater selectively heating air from the inlet duct, cargo carriers in the chamber, an insulating cover over the carriers, and a pipe supplying air to the cover and selectively receiving air from the inlet duct and heater.

References Cited in the file of this patent

UNITED STATES PATENTS

| Number | Name | Date |
|---|---|---|
| 1,427,872 | Verville | Sept. 5, 1922 |
| 2,058,252 | Parsons | Oct. 20, 1936 |
| 2,201,984 | Clark | May 28, 1940 |
| 2,268,183 | Bugatti | Dec. 30, 1941 |
| 2,370,035 | Heymann | Feb. 20, 1945 |
| 2,447,665 | Protzeller | Aug. 24, 1948 |
| 2,472,623 | Schulze | June 7, 1949 |
| 2,499,736 | Kleen | Mar. 7, 1950 |
| 2,501,898 | Haggerty | Mar. 28, 1950 |
| 2,553,881 | Suttles | May 22, 1951 |